United States Patent [19]

Narutaki

[11] Patent Number: 5,087,125
[45] Date of Patent: Feb. 11, 1992

[54] EQUIPMENT FOR MEASURING A DIFFERENCE IN ELEVATION

[75] Inventor: Yoshinori Narutaki, Tokyo, Japan

[73] Assignee: Optec Co., Ltd., Tokyo, Japan

[21] Appl. No.: 581,355

[22] Filed: Sep. 12, 1990

Related U.S. Application Data

[63] Continuation of Ser. No. 177,237, Apr. 4, 1988, abandoned.

[30] Foreign Application Priority Data

Apr. 8, 1987 [JP] Japan .................... 62-86525

[51] Int. Cl.$^5$ ................... G01C 5/00; G01C 3/22
[52] U.S. Cl. ........................ 356/375; 356/4; 356/149; 33/294
[58] Field of Search .............. 356/4, 375, 149, 250; 33/293, 294

[56] References Cited

U.S. PATENT DOCUMENTS

| | | | |
|---|---|---|---|
| 2,981,141 | 4/1961 | Armstrong et al. | 356/250 |
| 4,439,672 | 3/1984 | Salaman | 235/463 |
| 4,488,050 | 12/1984 | Iwafune | 33/293 |
| 4,673,287 | 6/1987 | Rickus | 33/294 |
| 4,715,714 | 12/1987 | Gaechter et al. | 356/375 |

FOREIGN PATENT DOCUMENTS

| | | |
|---|---|---|
| 3833778A1 | 7/1989 | Fed. Rep. of Germany . |
| 58-72007 | 4/1983 | Japan . |
| 60-25413 | 2/1985 | Japan . |
| 63-180811 | 7/1988 | Japan . |
| 63-180815 | 7/1988 | Japan . |

*Primary Examiner*—Richard A. Rosenberger
*Attorney, Agent, or Firm*—Pennie & Edmonds

[57] ABSTRACT

An equipment for measuring difference in elevation employing a leveling pole and a level is disclosed. The leveling pole comprises divisions of coded marks each indicating height at a unit interval. The level comprises a telescope and an image sensor. The output signal of the sensor is decoded for display of digital height value. A plate glass is provided in front of an object lens for vertical compensation of an optical axis of the telescope. An inclination angle of the plate glass required for compensation is used for interpolation between two adjacent coded marks.

9 Claims, 9 Drawing Sheets

EQUIPMENT FOR MEASURING A DIFFERENCE IN ELEVATION

This is a continuation of application Ser. No. 07/177,237, filed Apr. 4, 1988, now abandoned.

BACKGROUND OF THE INVENTION

1. Field of the Invention

The present invention relates to an equipment for measuring a difference in elevation between two points.

2. Description of the Prior Art

Measurement of difference in elevation is generally performed using a leveling pole and a leveling instrument, which is called a level. The leveling pole is set up at two measuring points, and its divisions are alternately read using a horizontally placed telescope comprised by the level. Then, a difference between the read values is obtained as a difference in elevation.

In addition, collimation cross hairs are arranged within a field of view of the telescope of the level. A horizontal distance can be roughly measured using two stadia lines affixed to the cross hairs at a predetermined interval. In this case, the distance between the stadia lines is read, and the horizontal distance is calculated according to a telescopic magnification.

In such conventional method of measuring a difference in elevation, since an operator reads the divisions on the leveling pole, it is difficult to realize a digital display. In addition, reading of numerical values in a data processor, data storage, and automatic data processing cannot be performed. The field of view of a telescope in a level is as narrow as 1°20'. Therefore, digital numbers displayed on the leveling pole at intervals coarser than those of the divisions may fall outside the field of view, and a height value may be erroneously read. In a stadia measurement, since a horizontal distance must be obtained by multiplying a measurement value by a telescopic magnification, the calculation becomes cumbersome.

SUMMARY OF THE INVENTION

The present invention has been made in consideration of this problem, and has as its object to realize digital reading and display in measurement of difference in elevation using a leveling pole and a level.

It is an object of the present invention to arrange a means for interpolating height read values in a level so as to obtain a digital height measurement value with sufficient precision.

It is another object of the present invention to provide a leveling pole which can prevent erroneous reading of digital height values.

It is still another object of the present invention to allow a digital display of an approximate horizontal distance.

These and other objects of the invention will become more apparent in the detailed description and examples which follow.

DETAILED DESCRIPTION OF THE PREFERRED EMBODIMENT

Figure 1:
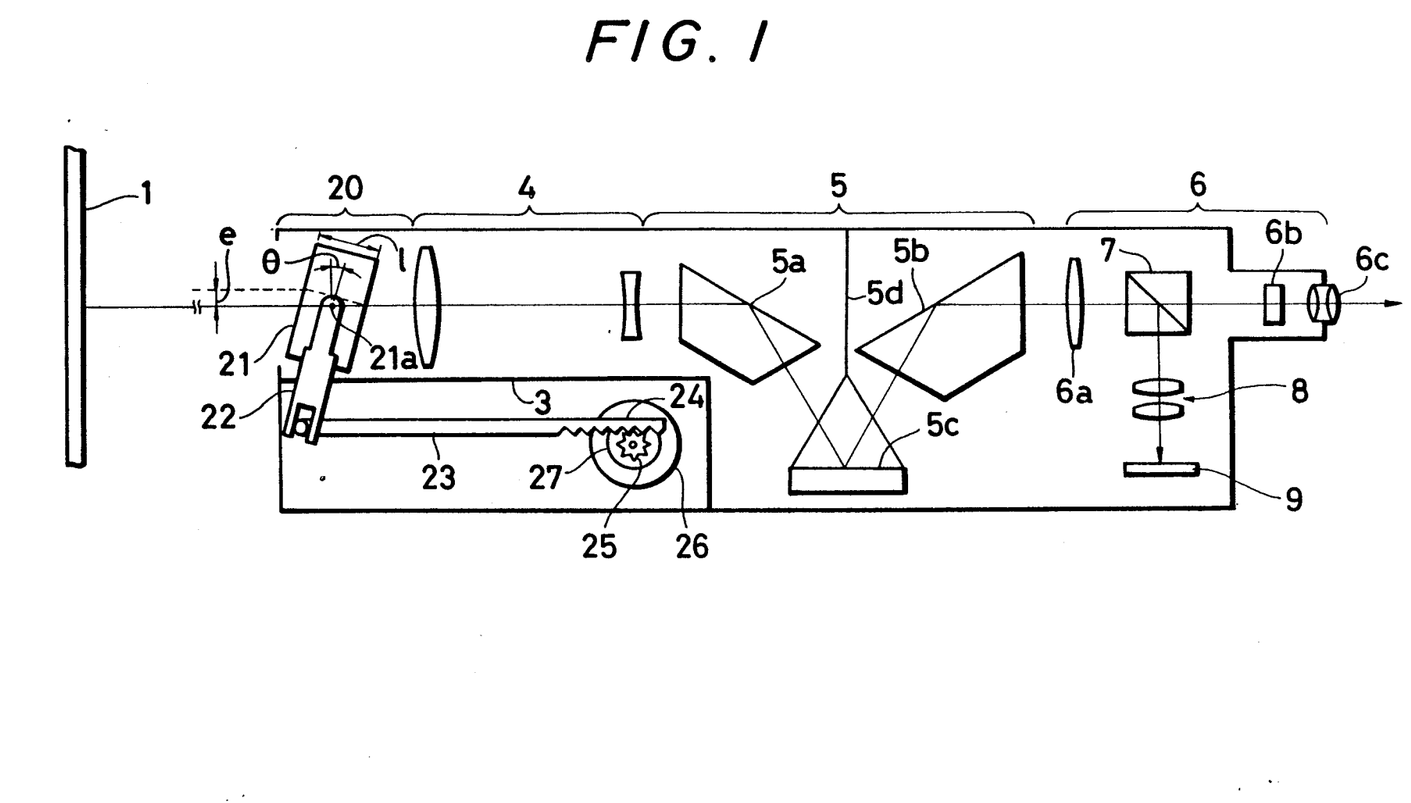
FIG. 1 is a schematic view of an optical system of a level according to the present invention.
Figure 2:
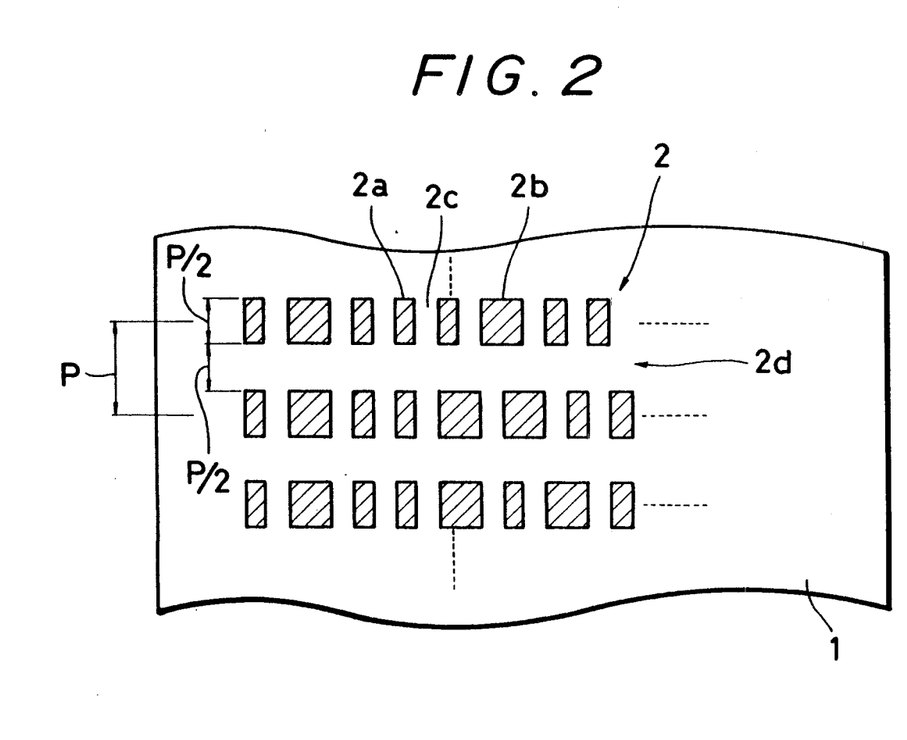
FIG. 2 is an enlarged view showing a main part of a leveling pole.

FIG. 1 shows an optical system of a level to which the present invention is applied. FIG. 2 is a front view of a main part of a leveling pole to be measured.

Bar codes 2 for optical reading, which are obtained by converting height values into absolute codes, are arranged on a division face of a leveling pole 1 from its proximal end in its longitudinal direction (a height direction) at a unit interval P of, e.g., 10 mm. The vertical lengths of each bar code 2 and a line space 2s between adjacent codes are respectively set to be 5 mm (P/2). The height value represented by each bar code corresponds to the height of an upper end of a corresponding bar code. Each bar code 2 is constituted by a narrow bar 2a (corresponding to logic "0"), a wide bar 2b (corresponding to logic "1"), and a space 2c. The bars 2a and 2b correspond to low-reflectance portions (black), and the space 2c corresponds to a high-reflectance portion (white). As a code system, a code system used in the industrial or commercial field can be used. Such code systems include the 3 of 9 code, the 2 of 5 code, the NRZ system code such as UPC (Universal Product Code), EAN (Europe Article Numbering), or JAN (Japan Article Numbering), or the like.

A level 3 has an arrangement similar to that of a known automatic level and comprises an object lens system 4, an automatic horizontal optical system 5, and an eyepiece system 6. The eyepiece system 6 includes a focusing lens 6a, a focusing lens 6b to which cross hairs and stadia lines are affixed, and an eyepiece 6c. The automatic horizontal optical system 5 is an automatic horizontal unit for obtaining a horizontal collimation line regardless of an optical axis of a telescope, and is constituted by prisms 5a and 5b, and a pendulum mirror or a pendulum prism 5c suspended through a string 5d.

A beam splitter 7 is inserted in the eyepiece system 6. Split image light is focused on an image sensor 9 through a magnifying lens system 8. This image sensor 9 may be constituted by, e.g., a CCD line sensor and is located such that a reading line coincides with the widthwise direction of the leveling pole 1, i.e., an aligning direction of coded elements of each bar code 2. The optical axis is located on the reading line. An output from the image sensor 9 is supplied to the processing circuit in FIG. 3. Then, the read bar code 2 is decoded and a height value is displayed.

In order to improve measurement precision by interpolating read values, a micro optical system 20 including a plate glass 21 having horizontal surfaces which can be angularly displaced is arranged on a front side of the object lens system 4. Assume that the thickness of the plate glass 21 is l, the inclination angle thereof with respect to a vertical plane (lens surface) is $\theta$, and the reflectance of the plate glass 21 is n. Then, a horizontal moving amount e of the optical axis is given as:

$$e = \{(n-1)/n\} \times l \times \tan\theta$$

Interpolation correction of a value as small as 1/50 the unit division interval of the bar code 2 is performed using this horizontal moving amount of the optical axis (image moving amount).

An angle displacing mechanism for the plate glass 21 comprises a lever 22 coupled to a rotation shaft 21a, a link 23 coupled to the lever 22, a rack 24 and a pinion 25 arranged on an end portion of the line 23, and a pinion drive motor 26. A rotary encoder 27 is coupled to a shaft of the motor 26 so as to obtain a pulse string having a number of pulses proportional to the angle $\theta$ of the plate glass 21 or a code pulse representing an absolute angle. Note that a pulse motor may be used as the drive motor 26 to change the angle of the parallel plate glass 21 in units of minute angles using its drive pulses. In this case, the rotary coder is not required, but a counter for counting the drive pulses is provided instead.

Figure 3:
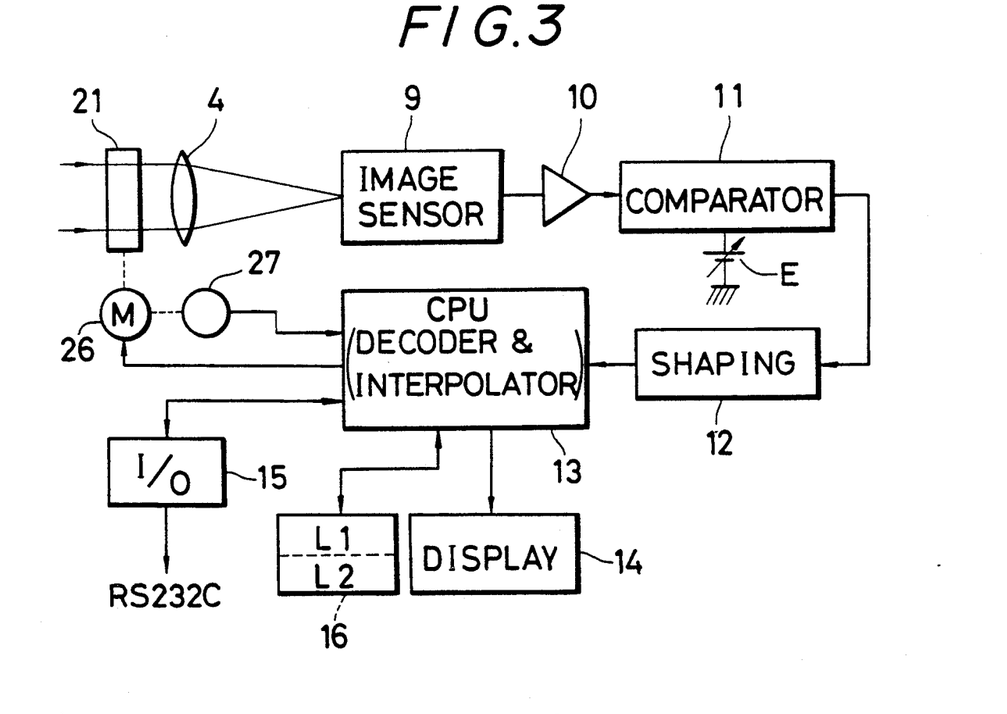
FIG. 3 is a block diagram of a data processing circuit.

In the processing circuit in FIG. 3, a bar code image of the leveling pole 1 focused on the image sensor is read as an electrical signal and supplied to a comparator 11 through an amplifier 10. The comparator 11 clips an electrical signal component having a level lower than a predetermined level E and extracts it as a bar code signal. In this case, when the image is out of focus or the reading line is located in the line space 2s between the bar codes in FIG. 2, an image output level is low, and hence it does not appear at the output of the comparator 11 and omitted. That is, signal levels allowing decoding operations are discriminated and erroneous decoded values are minimized.

An output from the comparator 11 is shaped by a waveform shaping circuit 12 and supplied to a CPU 13 as a code pulse in which the bars 2a and 2b of the bar code 2 have high levels, and the space 2c thereof has a low level. The CPU 13 discriminates that the narrow bar 2a is logic "0" and the wide bar 2b is logic "1" on the basis of the pulse width of the high-level portion of the code pulse. Then, these values are decoded as a height value.

Basically, a decode algorithm in the CPU 13 may be a pulse width determination by time measurement (bit counting in the CCD). More specifically, a time width data string is generated corresponding to element arrays of the narrow and wide bars by causing a pulse width corresponding to the high-level portion of an input code pulse to correspond to the number of clock pulses. Then, a code bit string is obtained by comparing the value of each data with a predetermined margin. The code bit string is converted into decimal values in units of bits by a decoder or a code table in a program of the CPU, stored in a memory as a height value, and is displayed by a display unit 14. In addition, the measured height value can be transferred to a portable terminal such as a portable computer from, e.g., an RS 232C type I/O port 15.

A so-called interleaved bar code, in which narrow and wide spaces are arranged in the space 2c of the bar code 2 to be used as a code together with the bar elements, may be used. In this case, the decoding principle is the same as in the above code.

Figure 4:
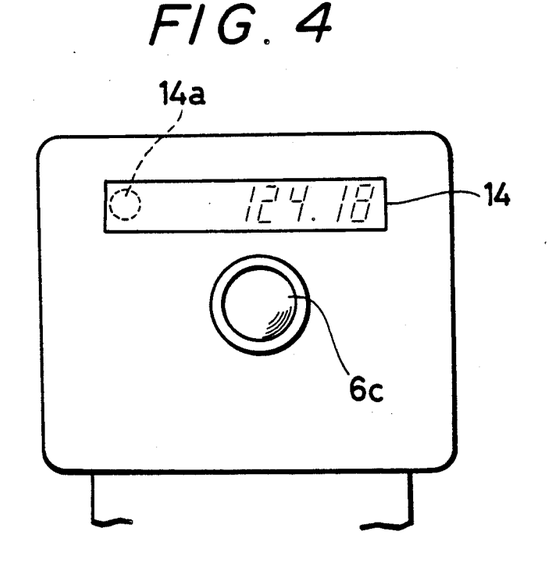
FIG. 4 is a front showing a rear portion of the level.

FIG. 4 is a front view of a rear panel of the level 3. The display unit 14 is arranged above the eyepiece 6c. A read height value is digitally displayed on the display unit 14.

An interpolation process using the micro optical system 20 will be described with reference to a process flow chart in FIG. 5 and FIGS. 6A to 6D showing picked up images.

Figure 5:
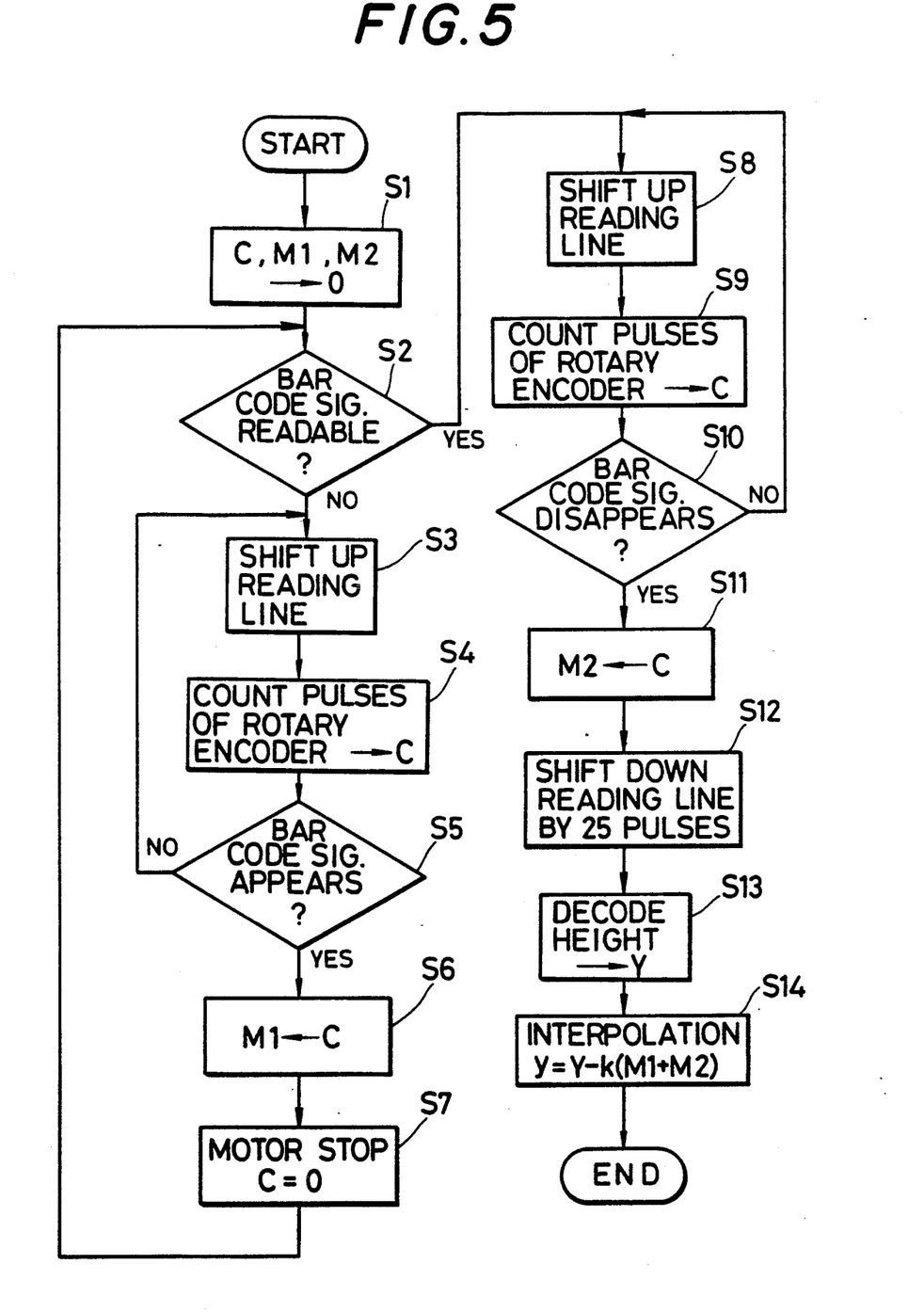
FIG. 5 is a flow chart of an interpolation process.

In step S1 in FIG. 5, in the CPU 13, registers corresponding to a counter C, and memories M1 and M2 are set. The counter C counts output pulses from the rotary encoder 27 upon rotation of the motor 26 in the optical system 20. The micro optical system 20 is arranged such that the collimation optical axis on the surface of the leveling pole 1 is moved by, e.g., 0.1 mm per pulse.

Figure 6A:
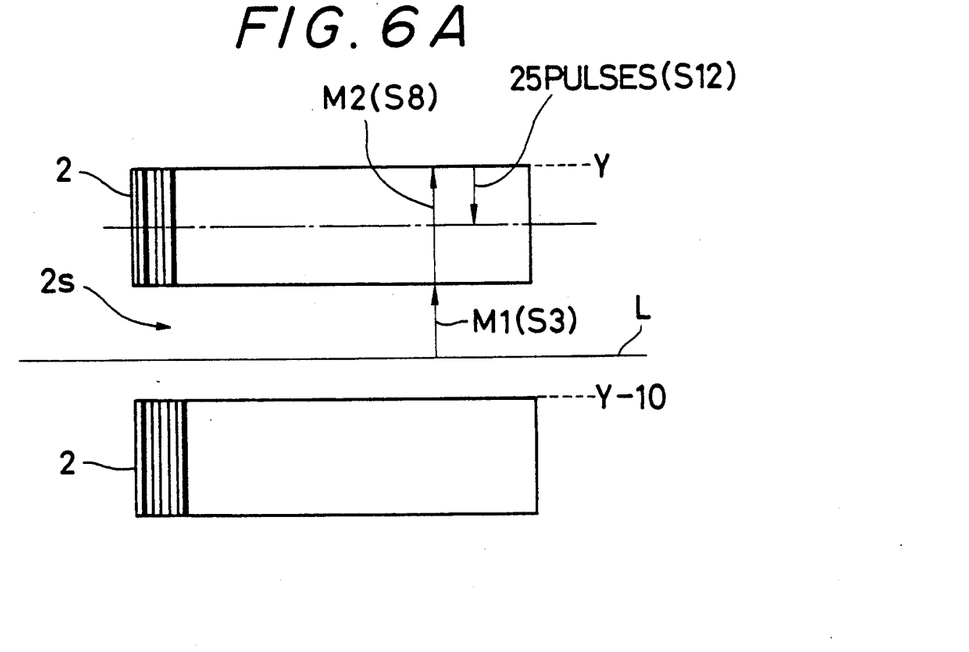
FIGS. 6A to 6D are views showing positional relationships between a reading line of an image sensor and bar code images.

In step S2, the presence/absence of a bar code signal is checked in a read output from the image sensor 9. When a reading line L is located in the line space 2s between the codes, as shown in FIG. 6A, a bar code signal is not obtained. Therefore, in this case, the motor 26 is driven to displace the angle of the parallel plate glass 21 and move the reading line L upward. Actually, an image on the image sensor 9 is moved downward with respect to the reading line L.

At the same time, pulse outputs from the rotary encoder 27 are counted (step S4). When a bar code signal is read while the image is moved, a count value C is stored in the M1 register, the motor 26 is stopped and the count value C is reset (steps S6 and S7). When the flow returns to step S2, it branches to a process for "presence of bar code". As a result, the reading line L is moved upward again and outputs from the encoder are counted (steps S8 and S9). When the reading line L crosses the vertical length (5 mm) of the bar code 2 upon movement of the image, a bar code signal cannot be read. In step S10, the absence of a bar code signal is detected, and the count value C at this time is stored in the M2 register. A standard count value is 50 pulses.

At this time, the motor 26 is reversed in step S12, and the reading line L is moved by a distance corresponding to 25 pulses, thereby shifting the reading line L to substantially the center of the bar code, i.e., to a position allowing reliable reading of a bar code signal. At this time, the bar code is decoded to obtain a read height value Y (mm) (step S13). The value Y corresponds to an upper end of the bar code 2 on the leveling pole 1. With the above operation, the measurement is completed, and then an the following equation (step 14):

$$y = Y - K(M1 + M2) \tag{1}$$

where K is a moving amount of the optical axis on the leveling pole 1 corresponding to one pulse from the rotary encoder, e.g., 0.1 mm. Upon completion of measurement, the parallel plate glass 21 is returned to the origin of the rotary encoder 27.

Figure 6B:
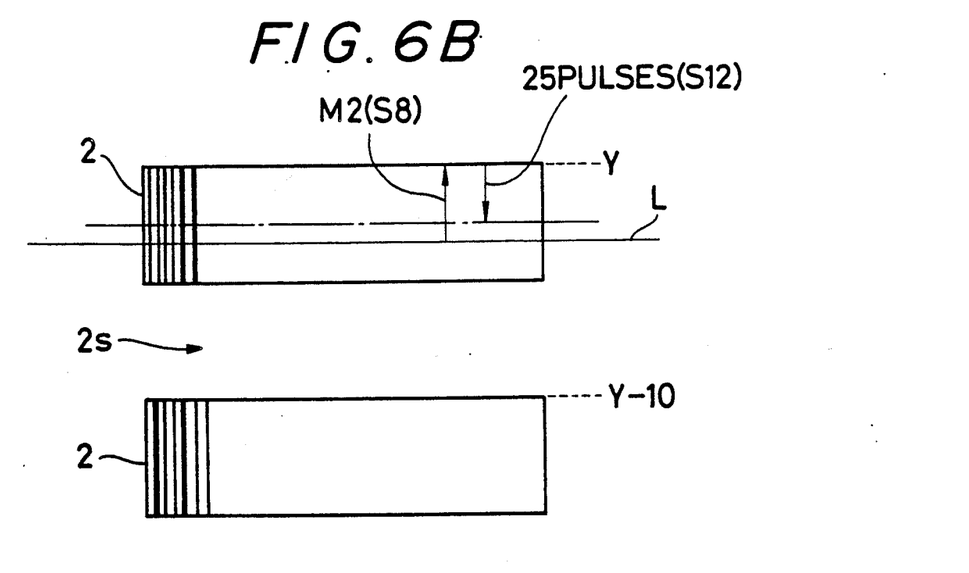
Figure 6C:
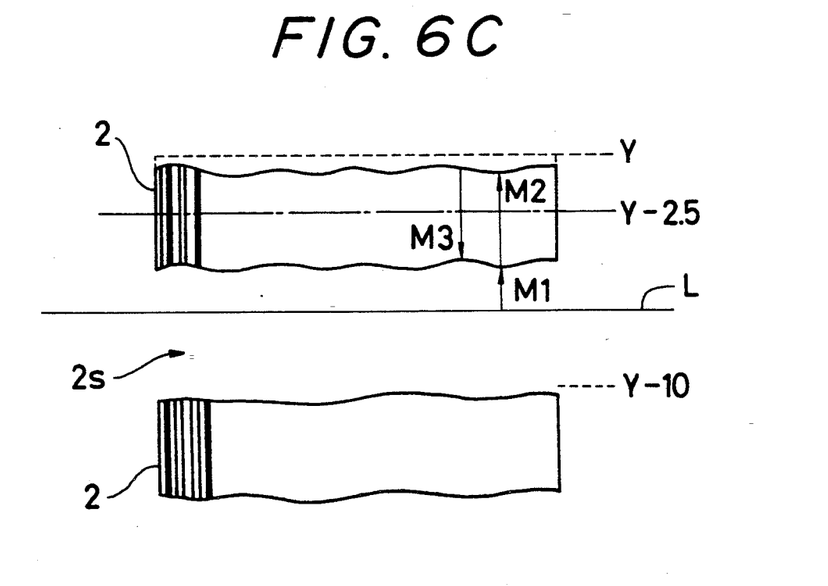

As shown in FIG. 6B, when the reading line L is located on the bar code 2 upon collimation, the flow branches to the process of "presence of bar code signal" in step S2, and measurement and interpolation calculation are performed in the same manner as described above. In this case, since M1=0 according to equation (1), interpolation is performed using only the value M2.

Note that a value Y−5 mm corresponding to a lower end line of the bar code 2 may be calculated from the decode value Y of the bar code 2 and interpolation processing may be performed on the basis of the lower end line.

Figure 6D:
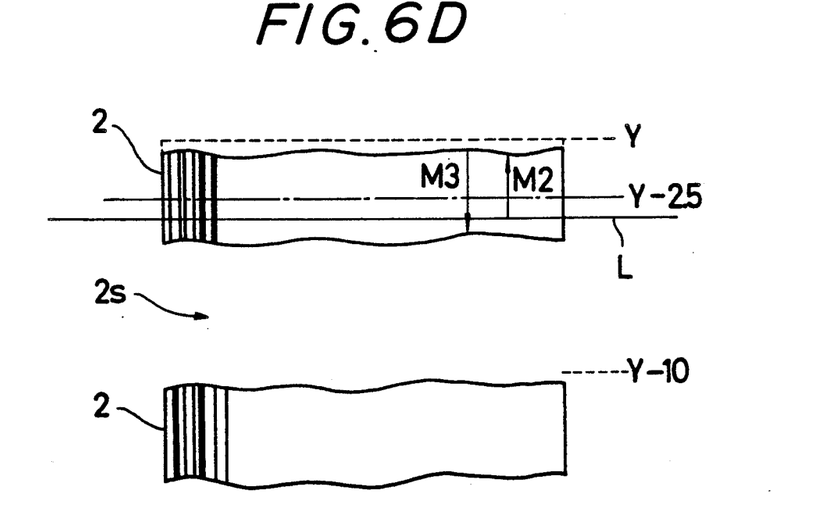

When horizontal collimation is performed, an edge of an image on the image sensor 9 may be obscure because of a focusing error. In such a case, the upper end position of the bar code 2 does not correctly correspond to the decode value Y. For this reason, as shown in FIG.

6D, a step of obtaining a count value M3 by pulse-counting the vertical length of the bar code 2 is preferably added. Although the value M3 is obtained in the same manner as described above in FIG. 6C, the value M2 can be used in place of the value M3 in this case. Since the center of the bar code 2 can be calculated from the decode value Y as Y−2.5 mm, an interpolation calculation for the center can be performed according to equation (2) below. The value M3 is smaller than a standard value of 50. For example, it is set to be 40 pulses.

$$y = Y - 2.5 + M3/2 - K(M1 + M2) \quad (2)$$

Assume that focus blurs are uniformly caused in the upper and lower end lines of the bar code. Then, a position higher by M3/2 from Y−2.5 mm (center) represents the actual upper end of the bar code. Therefore, the influence of the focusing error can be eliminated by an interpolation calculation according to equation (2).

In order to improve interpolation precision, an interpolation calculation is further performed with respect to the reading line L upon horizontal collimation on the basis of the lower bar code 2 (the bar code having a decode value of Y−10 mm in FIG. 6), and a mean value between the obtained value and a calculation value from the upper bar code 2 (Ý mm) may be obtained.

Although, the ratio of the bar code 2 to the line space 2s is 1:1 in the above example, this ratio may be arbitrarily set. For example, the length of the space 2s may be decreased, and that of the bar code 2 may be increased.

Figure 7:
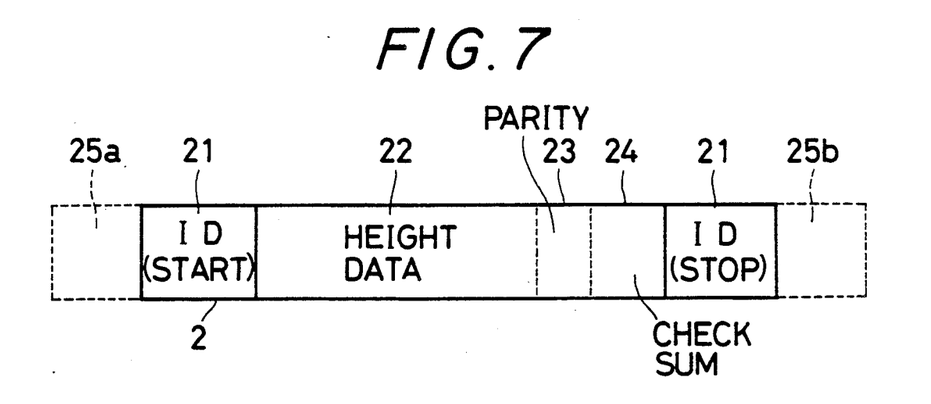
FIG. 7 is a view showing a format of bar codes affixed to the leveling pole.

As shown by a bar code format in FIG. 7, an identification symbol (ID code) 21 can be affixed to the bar code 2 so that dirt attached to the surface of the leveling pole 1 or an image behind the leveling pole such as a background is not erroneously read as information. This identification symbol 21 may be constituted by a special code, such as a "0000" sequence (four narrow bars and four spaces alternately appear), which is not likely to appear under natural conditions. The measurement process can be programmed such that a height value represented by the bar code 2 is decoded when this identification symbol 21 is read by the CPU 13. In addition, the identification symbols 21 may be affixed to the both ends of the bar code 2, and the flow may be programmed to advance to the decoding step only when the identification symbols 21 are correctly read at the both ends.

As shown in FIG. 7, a data area 22 having, e.g., 4 bits is arranged next to the identification symbol 21. A parity bit 23 is affixed to the LSB of the data area 22. Furthermore, a check sum 24 calculated in accordance with an arithmetic operation defined by the code system may be affixed to the data area 22.

Note that the identification symbol 21 may be used both as start and stop characters for causing the CPU 13 to identify start and end points of reading of code data. Start and stop margins 25a and 25b, each of which has a predetermined width and serving as a non-signal portion, are preferably affixed to the both ends of the bar code 2 on the leveling pole 1.

When the CPU 13 cannot correctly read the identification symbol 21 or the start/stop character code, it generates an alarm signal to cause the display unit 14 in FIG. 4 to turn on an NG display lamp 14a. In this case, the operator checks a focusing state and checks whether the bar code 2 is properly located in the field of view by looking through the eyepiece 6c.

If high-precision measurement is not required, the micro optical system 20 can be omitted. However, when the reading line is located in the line space 2s between the adjacent bar codes, reading becomes difficult. In this case, a sensor having a plurality of reading lines or a two-dimensional sensor with a matrix arrangement may be used as the image sensor 9. When a bar code cannot be read in the line space 2s, it can be read using another reading line shifted upward or downward with respect to the reading line located in the line space 2s.

Figure 8:
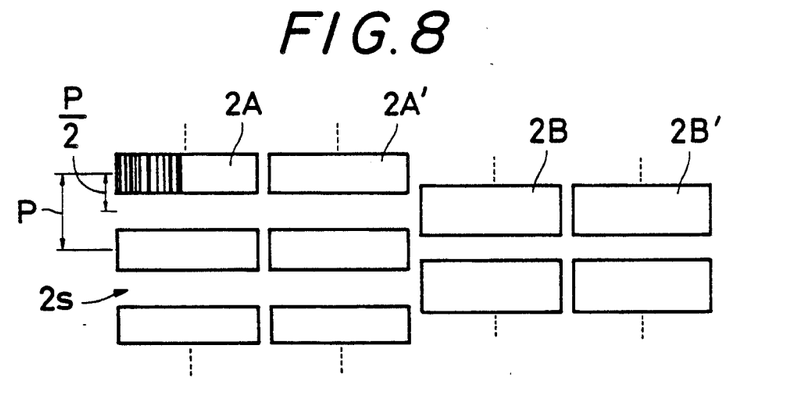
FIGS. 8 to 10 are schematic views showing modifications of bar code arrangements.

In order to improve the reading precision and decrease reading errors, a staggered array code arrangement shown in FIG. 8 can be employed. More specifically, bar codes 2A are arranged at a pitch P (unit division interval) as an A system, and bar codes 2B are arranged at the pitch P as a B system to be adjacent to the bar codes 2A in the widthwise direction of the leveling pole 1 and shifted in the longitudinal direction by ½ the pitch P. According to this arrangement, when the reading line is located in the line space 2s between the bar codes 2A and the identification symbol 21 cannot be read, a reading operation is switched to that of the bar codes 2B in the B system, thereby performing a desired reading.

If the code values of the bar codes 2A and 2B are shifted by ½ the pitch, a nominal measurement error can be decreased to half (±¼ the pitch). Even if the bar codes 2A and 2b have the same code value, the CPU 13 recognizes switching between the A and B systems to perform a correction operation with respect to the code value by ½ the pitch. As a result, a read value can be obtained with high precision, i.e., with a nominal error of ±¼ the pitch. If the image sensor 9 to be used has a sufficient number of bits (the number of elements) and a sufficient resolution, the area of the reading line of the image sensor 9 may be divided into first and second halves so that the bar codes 2A and 2B in the A and B systems can be respectively read through the divided areas.

Parts of the bar codes 2A and 2B preferably overlap each other in the longitudinal direction of the leveling pole 1. More specifically, as shown in FIG. 8, if the bar length of each bar code 2B in the B system is set to be larger than ½ the pitch and the bar codes B overlap the bar codes A in the A system in the longitudinal direction of the leveling pole 1, reading is not disabled.

Figure 9:
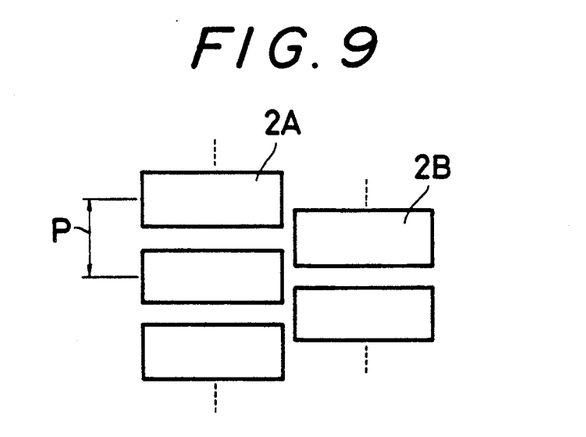

As shown in a modification of FIG. 9, both the bar lengths of the bar codes 2A and 2B may be set to be close to the pitch P to increase an overlap amount of each bar code, thereby improving the reading precision.

According to the code arrangement in FIG. 8, bar codes 2A' and 2B' are respectively arranged to be adjacent to the bar codes 2A and 2B in the A and B systems. The bar codes 2A' and 2B' are identical to the bar codes 2A and 2B, respectively. These bar codes 2A' and 2B' can be used for true value detection in the CPU 13. For example, a detection algorithm can be programmed such that decoding processing is performed only when the bits of the codes 2A and 2A' coincide with each other upon comparison, whereas error processing is performed when lack of coincidence is determined. When an error is detected in one of the check bits or check codes (parity or check sum, CRC, or the like) of the bar codes 2A and 2A', the other code may be read.

Figure 10:
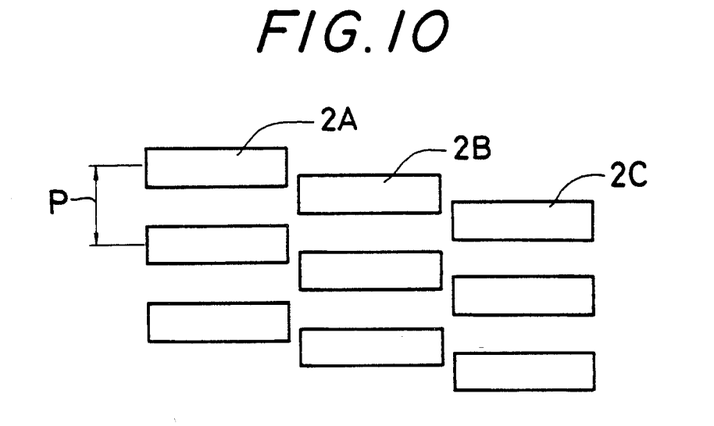

As shown in FIG. 10, the number of staggered bar code arrays may be increased to three or more. In the case of three arrays (2A to 2C) in FIG. 10, the nominal error becomes ⅓ the pitch P of one system.

Figure 11:
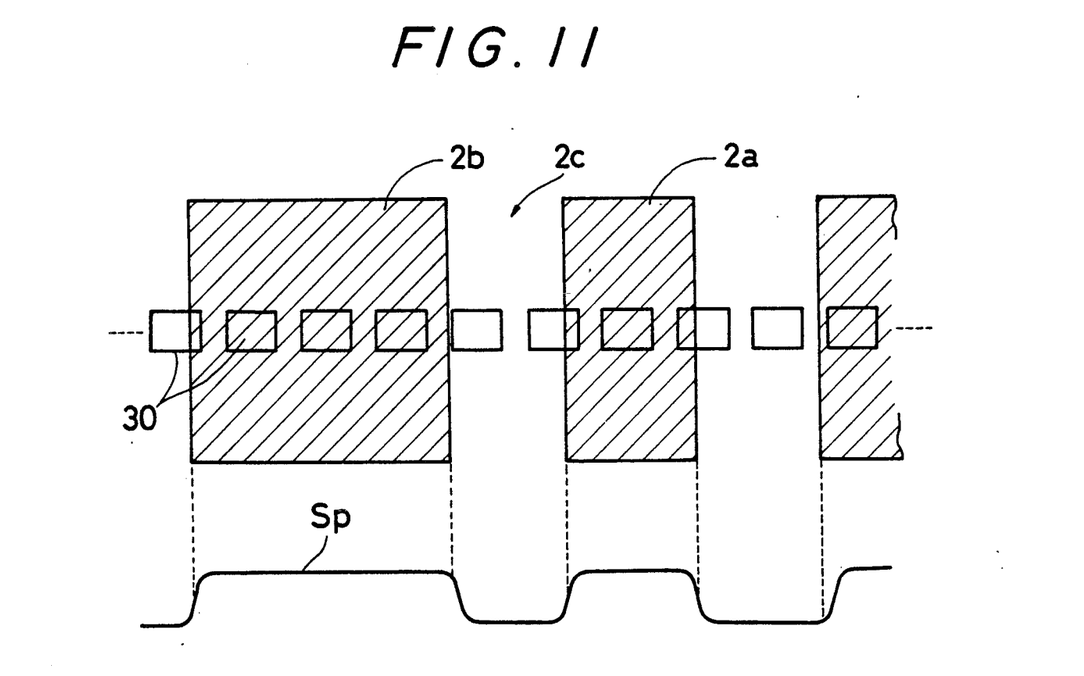
FIG. 11 is a schematic view showing a bar code image focused on an image sensor (CCD) and its image output.
Figure 12:
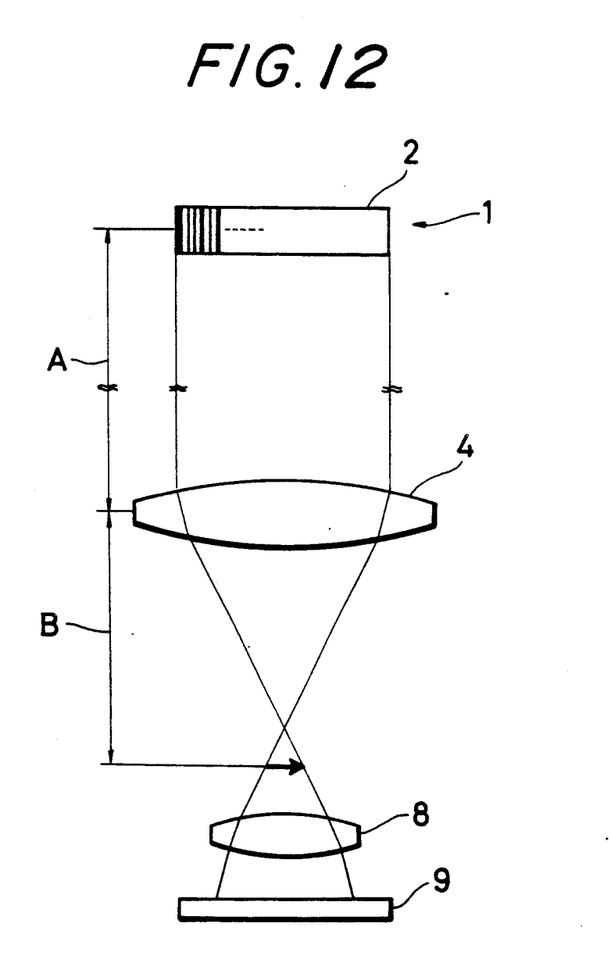
FIG. 12 is a schematic view of a read optical system.

FIG. 11 shows a relationship between an imaging surface, and a bar code image and an image signal output when a CCD line sensor is used as the image sensor 9. FIG. 12 is a schematic view of a read optical system.

The CCD line sensor has an array of light-receiving elements 30. When the narrow and wide bars 2a and 2b are imaged on the imaging surface of the CCD line sensor, a serial code pulse signal Sp corresponding to the images can be read. According to the sampling theorem, if at least two of the light-receiving elements 30 are included within the width of the image of the narrow bar 2a or space 2c, a code can be read on the basis of the pulse signal Sp.

In order to set the resolution and the number of bits of the CCD line sensor, the enlargement and reduction of images in accordance with changes in distance between the leveling pole 1 and the level 3 must be considered. Regarding this point, it can be considered that an image on the imaging surface is reduced in inverse proportion to the distance as follows. As shown in FIG. 12, when the read optical system is constituted by an object lens system 4, a magnifying lens system 8, and an image sensor 9, assuming that the focal distance of the object lens system 4 is f, the distance to the bar code 2 on the leveling pole 1 is A, and the distance to an imaging point is B, $$1/A + 1/B = 1/f, \quad B = (A \cdot f)/(A - f)$$

Then, a magnification u is given as: $u = B/A = (B-f)/f$. In the level for measuring a difference in elevation, the distance A to the leveling pole falls within the range of 2 m to 100 m. If the object lens system 4 having $f = 100$ mm is used, when A is 100 m, B is about 0.1001 m and the magnification u becomes 0.001001. Therefore, when the bar code 2 having a lateral width (the total length of the bar code) of 20 mm is to be telescoped, the size of the image obtained by the object lens system 4 is about 0.02002 mm (20 μm).

When A is set to be a minimum distance of 2 m, the size of the image becomes 1.05263 according to the same calculation. That is, the size of an image is changed at a ratio of about 1:50 for a change in distance to the leveling pole 1 from 100 m to 2 m.

Assume that the number of modules (the sum of the bar codes when the narrow bar 2a, the wide bar 2b, and the space bar 2c are respectively set to be one, two to three, and one) of the bar codes 2 is 50. Then, the image sensor 9 must have a resolution for obtaining a pulse code signal corresponding to the 50 modules. The number of elements in the CCD required to obtain a necessary resolution when $A = 100$ m is twice the total number of the modules, i.e., 100 bits in consideration of the Nyquist interval. When the interval between the light-receiving elements 30 in the CCD shown in FIG. 11 is 10 μm, the size of a bar code image corresponding to 100 bits must be about 1 mm. Therefore, if the magnification of the magnifying lens system 8 in FIG. 12 is set to be 50, the total width of a bar code on the imaging surface is about 1 mm, and the 50 modules in total can be read by about 100 bits, thereby obtaining a necessary resolution.

When $A = 2$ as described above, the size of an image is magnified to 50 times. Therefore, 5,000 (100 bits × 500) bits are required as the total number of elements in the CCD. In this case, the size of the image on the imaging surface is about 50 mm.

If the magnification of the telescope and the total number of bits in the image sensor 9 are increased, measurement of difference in elevation within a distance of about 200 m can be performed. Beyond that distance, bar code reading becomes difficult because of a wavelength of light and scintillation.

By utilizing the fact that the size of an image on the light-receiving surface of the image sensor 9 is changed in reverse proportion to the distance to the leveling pole, an approximate distance from the level 3 to the leveling pole 1 can be calculated by the CPU 13 and displayed. More specifically, the CPU 13 calculates the lateral width of a bar code image from a clock count on the basis of a code pulse signal input from the waveform shaping circuit 12. In the above example, the size of an image on the imaging surface is changed from 50 mm to 1 mm with respect to changes in distance from 2 m to 100 m. Therefore, if the CPU 13 performs a reverse proportion calculation of a known constant using these relationships and a measurement value of the width of an image, an approximate measurement value can be obtained. This measurement value is displayed on the display unit 14 shown in FIGS. 3 and 4.

An imaging magnification within the range of 2 to 100 m with respect to a standard distance (e.g., 50 m) can be calculated on the basis of the measurement value of the width of the image. This imaging magnification can be used as a normalizing coefficient with respect to each measurement pulse width in a discrimination algorithm for the narrow and wide bars 2a and 2b in code reading. More specifically, if a digital value of a pulse width corresponding to a narrow or wide bar is obtained by a normalizing operation and then a discrimination algorithm for comparison in size is performed, the program is further simplified and discrimination precision is improved.

In measurement of difference in elevation, since the leveling pole is set up at two points and a difference between read height values is obtained as a difference in elevation, this measurement can be automated using the level in the embodiment described above. More specifically, upon reading of the bar code 2 on the leveling pole 1, height values L1 and L2 at the two points are respectively stored in the memory 16 shown in FIG. 3 so that a difference between the values can be calculated by the CPU 13 and displayed on the display unit 14 as a height value.

In the above-described embodiment, a surveyor sets a focusing state by looking through the eyepiece 6c in the level 3. However, since a focal point varies depending on surveyors, an automatic focusing system may be employed. For example, a focusing lens motor and its servo circuit may be added. The focusing lens motor performs a servo operation for maximizing the differential level of an image output from the image sensor 9.

The level 3 in the above embodiment is a so-called automatic level having an automatic horizontal correction system. However, the present invention can be applied to a manual horizontal adjustment type Y level using a bubble tube or a tilting level.

Furthermore, in the embodiment, the bar codes are used as the height divisions. However, a code system using square segments may be employed. In addition, height numbers and height divisions in units of digits affixed to a normal leveling pole may be used together.

What is claimed is:

1. A level for use in combination with a leveling pole to be set up at a measuring point, said pole displaying divisions consisting of coded marks each digitally height of mark from an end of said pole at a unit interval, said interval comprising:

(i) a telescope optical system having an optical axis;
(ii) leveling means for making the telescope level;
(iii) an image sensor on which an image is focused by the optical system, said sensor having a linear image pickup device arranged to provide a signal responsive to an image of one of said coded marks; said linear image pickup device comprising:
a light-receiving element array extending parallel to the width of the image of said coded marks, having sufficient resolution for reading the image of said coded marks at a maximum distance of a measurable range between said level and said leveling pole, and wherein the length of said light-receiving element array is sufficient to allow said image sensor to read the image of said coded marks at a minimum distance of the measurable range;
(iv) a micro optical system provided in front of an object lens of said telescope optical system for vertical compensation of the optical axis thereof, said micro optical system comprising a plate glass having parallel planes facing said object lens and tilting means for inclining said plate glass about a horizontal axis normal to the optical axis of said telescope;
(v) decoder means coupled to the output of said image sensor for decoding the signal responsive to the image of the coded mark to provide a digital height signal; and
(vi) interpolation means comprising:
(a) means for detecting he inclination angle of said plate glass, comprising:
a pulse motor coupled to said tilting means so as to incline said plate glass and means for counting drive pulses of said pulse motor to generate data indicative of said inclination angle;
(b) detecting means for detecting alignment of the optical axis of the telescope with one of said coded marks in response to the signal provided by said image sensor, as said plate glass is tilted by said tilting means; and
(c) interpolator means for calculating an interpolated height value in accordance with the signal from said decoder means and with angle data from said means for detecting the inclination angle.

2. A level according to claim 1, further comprising display means for digital indication of digital height value.

3. A level according to claim 1, wherein said telescope optical system comprises an eyepiece for aligning the optical axis thereof with the leveling pole and a beam splitter for dividing incident rays between said eyepiece and said image sensor.

4. A level according to claim 1, wherein said leveling means is an automatic optical level system comprising a pendulum mirror, a first fixed prism for conducting incident rays onto a surface of said pendulum mirror and a second fixed prism for conducting reflected rays from said mirror onto the surfaces of said image sensor.

5. A level according to claim 1, further comprising means for detecting the length of an image on a sensor surface on the basis of an output from said image sensor, and means for calculating a horizontal distance between said level and said leveling pole responsive to the length of the image and the magnification of said telescope, wherein the length of a coded mark on said leveling pole corresponds to said image, and means for displaying the calculated horizontal distance.

6. The level of claim 1 in combination with a leveling pole to be set up at a level point for measuring difference in elevation, said pole comprising:
divisions at unit intervals and coded marks each indicating the height of said divisions from one end of said leveling pole.

7. The combination of claim 6, wherein said divisions are the vertical edges of said coded marks.

8. The combination of claim 6, wherein each of said coded marks comprises a height code and an identification code.

9. The combination of claim 6, wherein each of said coded marks is a bar code mark comprising marks and spaces arranged horizontally on the pole surface.

* * * * *